United States Patent [19]
Gray et al.

[11] Patent Number: 6,150,509
[45] Date of Patent: Nov. 21, 2000

[54] WATER-INSOLUBLE YELLOW MONOAZO PIGMENT

[75] Inventors: Alan Gray, Mississauga; Henry Lui, Ajax; Dorothy-Grace Manarang, Pickering, all of Canada

[73] Assignee: Dominion Colour Corporation, Toronto, Canada

[21] Appl. No.: 09/439,502

[22] Filed: Nov. 12, 1999

[51] Int. Cl.$^7$ .................................................. C09B 29/33
[52] U.S. Cl. ........................ 534/742; 534/581; 106/496
[58] Field of Search .................................. 534/742, 581; 106/496

[56] References Cited

U.S. PATENT DOCUMENTS 3,555,002  1/1971  Ribka et al. ............................ 534/742

Primary Examiner—Fiona T. Powers
Attorney, Agent, or Firm—Robert F. Delbridge

[57] ABSTRACT

A water-insoluble yellow monoazo pigment has the following formula (I):

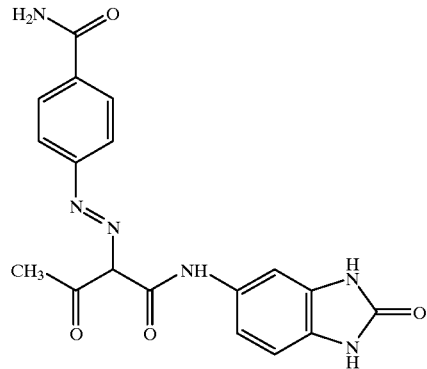

5 Claims, No Drawings

WATER-INSOLUBLE YELLOW MONOAZO PIGMENT

This invention relates to monoazo pigments, processes for their preparation and their use.

The present invention provides a water-insoluble yellow monoazo pigment having the following formula (I):

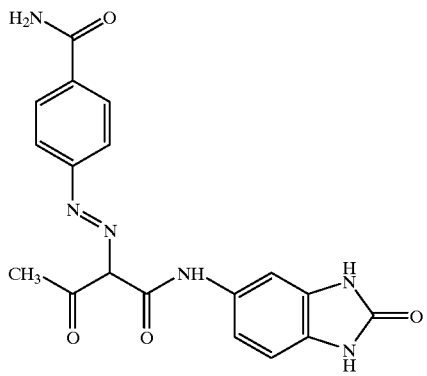

The invention also provides a colourant for the pigmenting of natural and synthetic materials comprising the above monoazo compound.

The invention further provides a process for preparing a water-insoluble yellow monoazo pigment of the above formula comprising diazotizing p-aminobenzamide to produce a diazonium compound, and coupling the diazonium compound with 5-acetoacetylaminobenzimidazolone.

A water-insoluble yellow monoazo pigment of formula (I) is a very good yellow pigment, which is distinguished in particular by excellent heat stability, bleeding resistance and very good light stability. The pigment can be used, for example, for the pigmenting of printing inks, lacquers, thermoplastic and thermosetting materials, natural resins and synthetic resins, polystyrene and its mixed polymers, polyolefins, in particular polyethylene and polypropylene and polyvinyl compounds, for example, polyvinyl chloride.

Examples of the invention will now be described. In the examples, parts and percentages given are by weight, unless stated otherwise. Parts by volume relate to parts by weight as the liter relates to the kilogram.

EXAMPLE 1

13.6 parts of p-aminobenzamide were dissolved in 200 parts water at 15–20° C. and 22 parts of 31.5% hydrochloric acid. The solution was cooled to 8° C. in an ice bath, then diluted with 450 parts water and diazotized with 36 parts by volume of 20% sodium nitrite to produce a diazo solution.

24.5 parts of 5-acetoacetylaminobenzimidazolone were dissolved in 167 parts water and 84.1 parts of 10% sodium hydroxide solution. The resultant solution was added dropwise into a cooled solution of 50.0 parts of sodium acetate and 16.3 parts of 92% acetic acid in 500 parts water, and the resulting suspension was diluted with 250 parts of water to produce a coupling component.

The diazo solution was slowly run into the coupling component at 23–25° C. ensuring that the pH was 5.0–5.4 after the strike. 2.0 parts of Ethomeen C15 (a surfactant) were then added and the mixture heated to 90–95° C. The resultant pigment suspension was stirred at 90–95° C. for 30 minutes, then filtered, washed and dried at 90° C. to produce a water-insoluble yellow monoazo pigment having the formula I.

EXAMPLE 2

The procedure of Example 1 was repeated, except that the 2.0 parts of Ethomeen C15 were added prior to the strike to produce a redder shade yellow pigment.

Other examples of the invention will be readily apparent to a person skilled in the art from the foregoing description, the scope of the invention being defined in the appended claims.

What is claimed is:

1. A water-insoluble yellow monoazo pigment having the following formula (I):

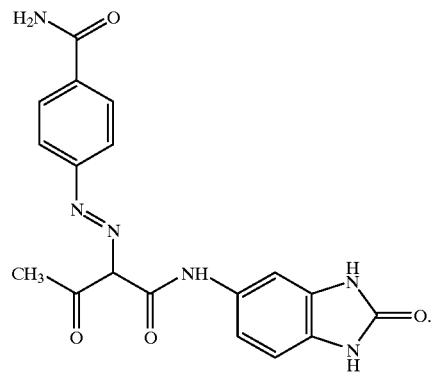

2. A colourant for the pigmenting of natural and synthetic materials comprising the monoazo pigment of claim 1.

3. A colourant for the pigmenting of printing inks, lacquers, thermoplastic, thermosetting materials, natural resins, synthetic resins, polystyrene and its mixed polymers, polyolefins, and polyvinyl compounds comprising the monoazo pigment of claim 1.

4. A colourant for the pigmenting of polystyrene, polyvinyl chloride, polyethylene and polypropylene comprising the monoazo pigment of claim 1.

5. A process for preparing a water-insoluble pigment of the following formula (I):

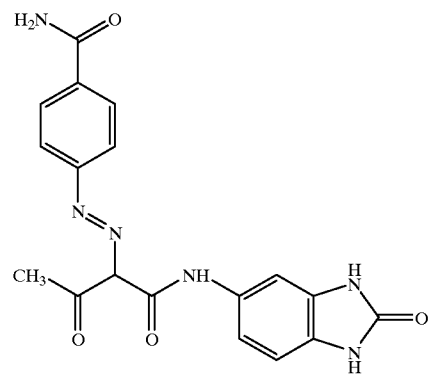

the process comprising diazotizing p-aminobenzamide to produce a diazonium compound, and coupling the diazonium compound with 5-acetoacetylaminobenzimidazolone.

* * * * *